United States Patent
Mussman et al.

(10) Patent No.: US 9,185,142 B2
(45) Date of Patent: *Nov. 10, 2015

(54) SYSTEM AND METHOD FOR PROVIDING ALTERNATE ROUTING IN A NETWORK

(75) Inventors: Harry Mussman, Beford, MA (US);
James O'Brien, Somerville, MA (US);
Eric R. Sporel, Westfor, MA (US);
Robert K. Israel, Lafayette, CO (US);
Michael Baj, Newton, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 1073 days.

This patent is subject to a terminal disclaimer.

(21) Appl. No.: 12/534,737

(22) Filed: Aug. 3, 2009

(65) Prior Publication Data

US 2010/0157983 A1    Jun. 24, 2010

Related U.S. Application Data

(63) Continuation of application No. 11/693,598, filed on Mar. 29, 2007, now Pat. No. 7,570,632, and a continuation of application No. 10/629,517, filed on Jul. 29, 2003, now Pat. No. 7,215,643.

(51) Int. Cl.
*H04L 12/66* (2006.01)
*H04L 29/06* (2006.01)
*H04L 1/22* (2006.01)
(Continued)

(52) U.S. Cl.
CPC ............. *H04L 65/1043* (2013.01); *H04L 1/22* (2013.01); *H04L 12/5692* (2013.01); *H04L 29/06027* (2013.01); *H04L 65/103* (2013.01); *H04L 65/104* (2013.01); *H04L 65/1069* (2013.01); *H04L 65/80* (2013.01); *H04M 7/0057* (2013.01); *H04Q 3/66* (2013.01); *H04Q 2213/13034* (2013.01); *H04Q 2213/13138* (2013.01);
(Continued)

(58) Field of Classification Search
CPC ............. H04L 29/1216; H04L 61/157; H04Q 2213/13384; H04Q 3/62; H04Q 2213/1322; H04Q 2213/13331
See application file for complete search history.

(56) References Cited

U.S. PATENT DOCUMENTS 4,284,852 A    8/1981    Szybicki et al.
4,679,186 A    7/1987    Lea
(Continued)

FOREIGN PATENT DOCUMENTS

EP    0966145 A2    12/1999
EP    1035719 A2    9/2000
(Continued)

OTHER PUBLICATIONS

"Canadian Office Action dated Dec. 15, 2010,", counterpart Canadian App. No. 2443097 filed Apr. 8, 2002, 3 pgs.
(Continued)

*Primary Examiner* — Chirag Shah
*Assistant Examiner* — Jenkey Van

(57) ABSTRACT

Methods and systems are described for performing alternate routing of communications in a network. The system initiates a communication from an origination endpoint in a packet-switched network, such as a VOIP network, to a destination endpoint, and determining, according to selection criteria, whether to route the communication to the destination endpoint using at least a second circuit-switched network, such as the PSTN.

8 Claims, 12 Drawing Sheets

(51) Int. Cl.
*H04L 12/54* (2013.01)
*H04M 7/00* (2006.01)
*H04Q 3/66* (2006.01)

(52) U.S. Cl.
CPC .............. *H04Q2213/13141* (2013.01); *H04Q 2213/13167* (2013.01); *H04Q 2213/13389* (2013.01)

(56) References Cited

U.S. PATENT DOCUMENTS

| | | | |
|---|---|---|---|
| 4,991,204 A | 2/1991 | Yamamoto et al. | |
| 5,058,105 A | 10/1991 | Mansour et al. | |
| 5,956,339 A | 9/1999 | Harada et al. | |
| 6,067,545 A | 5/2000 | Wolff | |
| 6,122,255 A | 9/2000 | Bartholomew et al. | |
| 6,141,345 A | 10/2000 | Goeddel et al. | |
| 6,157,636 A | 12/2000 | Voit et al. | |
| 6,275,574 B1 * | 8/2001 | Oran | 379/201.01 |
| 6,363,065 B1 | 3/2002 | Thornton et al. | |
| 6,366,576 B1 | 4/2002 | Haga | |
| 6,430,282 B1 | 8/2002 | Bannister et al. | |
| 6,452,922 B1 | 9/2002 | Ho | |
| 6,510,219 B1 | 1/2003 | Wellard et al. | |
| 6,574,216 B1 | 6/2003 | Farris et al. | |
| 6,581,104 B1 | 6/2003 | Bereiter | |
| 6,606,668 B1 | 8/2003 | MeLampy et al. | |
| 6,628,617 B1 | 9/2003 | Karol et al. | |
| 6,714,535 B1 | 3/2004 | Herh | |
| 6,754,181 B1 | 6/2004 | Elliott et al. | |
| 6,771,640 B2 | 8/2004 | Karamchedu et al. | |
| 6,775,269 B1 | 8/2004 | Kaczmarczyk et al. | |
| 6,798,786 B1 | 9/2004 | Lo et al. | |
| 6,826,272 B1 | 11/2004 | Dalrymple et al. | |
| 6,889,321 B1 | 5/2005 | Kung et al. | |
| 6,940,849 B2 | 9/2005 | Eichen et al. | |
| 6,973,504 B2 | 12/2005 | Nomura | |
| 6,996,093 B2 | 2/2006 | Dalton, Jr. et al. | |
| 7,002,970 B1 | 2/2006 | Veschi | |
| 7,031,450 B2 | 4/2006 | Evslin | |
| 7,113,500 B1 | 9/2006 | Bollinger et al. | |
| 7,145,898 B1 | 12/2006 | Elliott | |
| 7,203,956 B2 | 4/2007 | Thomas et al. | |
| 7,239,629 B1 | 7/2007 | Olshansky et al. | |
| 7,283,519 B2 | 10/2007 | Girard | |
| 7,330,463 B1 * | 2/2008 | Bradd et al. | 370/352 |
| 7,339,934 B2 | 3/2008 | Mussman et al. | |
| 7,379,471 B2 | 5/2008 | Mitsumori et al. | |
| 7,570,632 B2 | 8/2009 | Mussman et al. | |
| 7,586,899 B1 | 9/2009 | Mohaban et al. | |
| 7,720,084 B2 | 5/2010 | Mussman et al. | |
| 8,948,190 B2 | 2/2015 | McGuigan et al. | |
| 2001/0003522 A1 | 6/2001 | Masuhiro | |
| 2002/0101860 A1 | 8/2002 | Thornton et al. | |
| 2002/0122547 A1 * | 9/2002 | Hinchey et al. | 379/221.01 |
| 2002/0126701 A1 | 9/2002 | Requena | |
| 2002/0136206 A1 | 9/2002 | Gallant et al. | |
| 2003/0046400 A1 | 3/2003 | Friel et al. | |
| 2003/0059005 A1 | 3/2003 | Meyerson et al. | |
| 2003/0091024 A1 | 5/2003 | Stumer | |
| 2003/0095541 A1 | 5/2003 | Chang et al. | |
| 2003/0095542 A1 * | 5/2003 | Chang et al. | 370/352 |
| 2003/0118006 A1 | 6/2003 | Yang et al. | |
| 2003/0123436 A1 * | 7/2003 | Joseph et al. | 370/352 |
| 2003/0161458 A1 * | 8/2003 | Da Palma et al. | 379/218.01 |
| 2004/0172464 A1 | 9/2004 | Nag | |
| 2004/0179515 A1 | 9/2004 | Kamani et al. | |
| 2004/0208186 A1 | 10/2004 | Eichen et al. | |
| 2010/0226363 A1 | 9/2010 | McGuigan et al. | |

FOREIGN PATENT DOCUMENTS

| | | |
|---|---|---|
| EP | 1089535 A2 | 4/2001 |
| EP | 1014633 B1 | 9/2004 |
| WO | WO-99/14931 A2 | 3/1999 |
| WO | WO-00/75744 A2 | 12/2000 |
| WO | WO-01/05115 A2 | 1/2001 |

OTHER PUBLICATIONS

Loa, et al., "Enhanced H.323 Gateway with IVR Agent and H.323 Gatekeepers", MotorolaTechnical Developments; Motorola Inc., Schaumburg, II., vol. 39, Sep. 1999, 120-123.

Pearlman, et al., "Alternate Path Routing in Mobile Ad:Hoc Networks", IEEE MILCOM; Los Angeles, CA Oct. 2000, 1-6.

U.S. Appl. No. 14/613,295, Feb. 3, 2015, McGuigan et al.

* cited by examiner

SYSTEM AND METHOD FOR PROVIDING ALTERNATE ROUTING IN A NETWORK

CROSS-REFERENCE TO RELATED APPLICATIONS

This patent application is a continuation of patent application Ser. No. 11/693,598, filed Mar. 29, 2007, entitled "System and Method for Providing Alternate Routing in a Network", which is a continuation of patent application Ser. No. 10/629,517, filed Jul. 29, 2003, entitled "System and Method for Providing Alternate Routing in a Network", which is related to patent application Ser. No. 09/827,352, filed Apr. 6, 2001, entitled "Alternate Routing of Voice Communications in a Packet-Based Network", all of which are incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The invention disclosed herein relates generally to providing alternate routing of communications in a network. More particularly, the present invention relates to routing packets switch communications, such as Voice over Internet Protocol ("VoIP") communications from packet-switched network to a circuit-switched network such as the public switched telephone network ("PSTN") or other alternate network.

For many years, the PSTN has provided a reliable mechanism for transmitting voice communications. With the rise of available bandwidth on the Internet, however, VoIP systems have become increasingly popular. These newer systems offer a number of advantages over the PSTN including more efficient use of network bandwidth, lower cost of ownership, and advanced services such as video conferencing.

One disadvantage associated with conventional VoIP networks is that they are highly dependent on the availability of network bandwidth to provide an acceptable quality of service ("QoS") for communications. Further, these networks are also highly dependent on the availability of network components to complete calls. If the network bandwidth drops below a certain threshold or a critical network component is unavailable, then a call placed on a conventional VoIP network typically will not reach its intended destination and will fail. Conventional VoIP networks are thus relatively fragile systems that are dependent on conditions existing above given thresholds within their networks to complete calls.

There is thus also a need for a robust system which enables alternate routing of communications in a network. More particularly, there is a need for a system that enables the routing of VoIP communications to the PSTN when sufficient VoIP network resources are unavailable to complete a communication.

SUMMARY OF THE INVENTION

The present invention addresses, among other things, the problems discussed above performing routing in a network.

In accordance with some aspects of the present invention, computerized methods are provided for initiating a communication from an origination endpoint in a packet-switched network to a destination endpoint, and determining according to selection criteria, whether to route the communication to the destination endpoint using at least a second circuit-switched network. In some embodiments, a VoIP communication is initiated from an origination endpoint in a VoIP network and routed to a destination endpoint using the PSTN network.

In some embodiments, the selection criteria used to determine whether to route the communication using at least a second circuit-switched network includes the availability of a network resource such as a communication link or a network component. For example, in some embodiments, the communication is routed using at least a second circuit-switched network if the resources for a communication link are below a specified threshold. For example, in some embodiments, the specified threshold is determined by counting the number of voice calls on the link and comparing them to a predetermined call count limit, such as a link bandwidth limit or other threshold. In other embodiments, the communication is routed using at least a second circuit-switched network if a network component, such as the destination endpoint, a call mediator, a gatekeeper, a gateway, or a router, is unavailable.

In some embodiments, the availability of a network component is determined by parsing an admission request containing a network address associated with a network endpoint, and determining if components associated with the network address are members of a set of available components. For example, in some embodiments, a gatekeeper receives an admission request containing a network address associated with the network endpoint, and determines the availability of the network endpoint by determining whether the network address is a member of a set of available network addresses. As another example, in some embodiments, a gatekeeper receives an admission request containing a network address associated with a network endpoint, and determines the availability of a call mediator by determining whether a call mediator associated with the network address is a member of a set of available call mediators.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Figure 1:
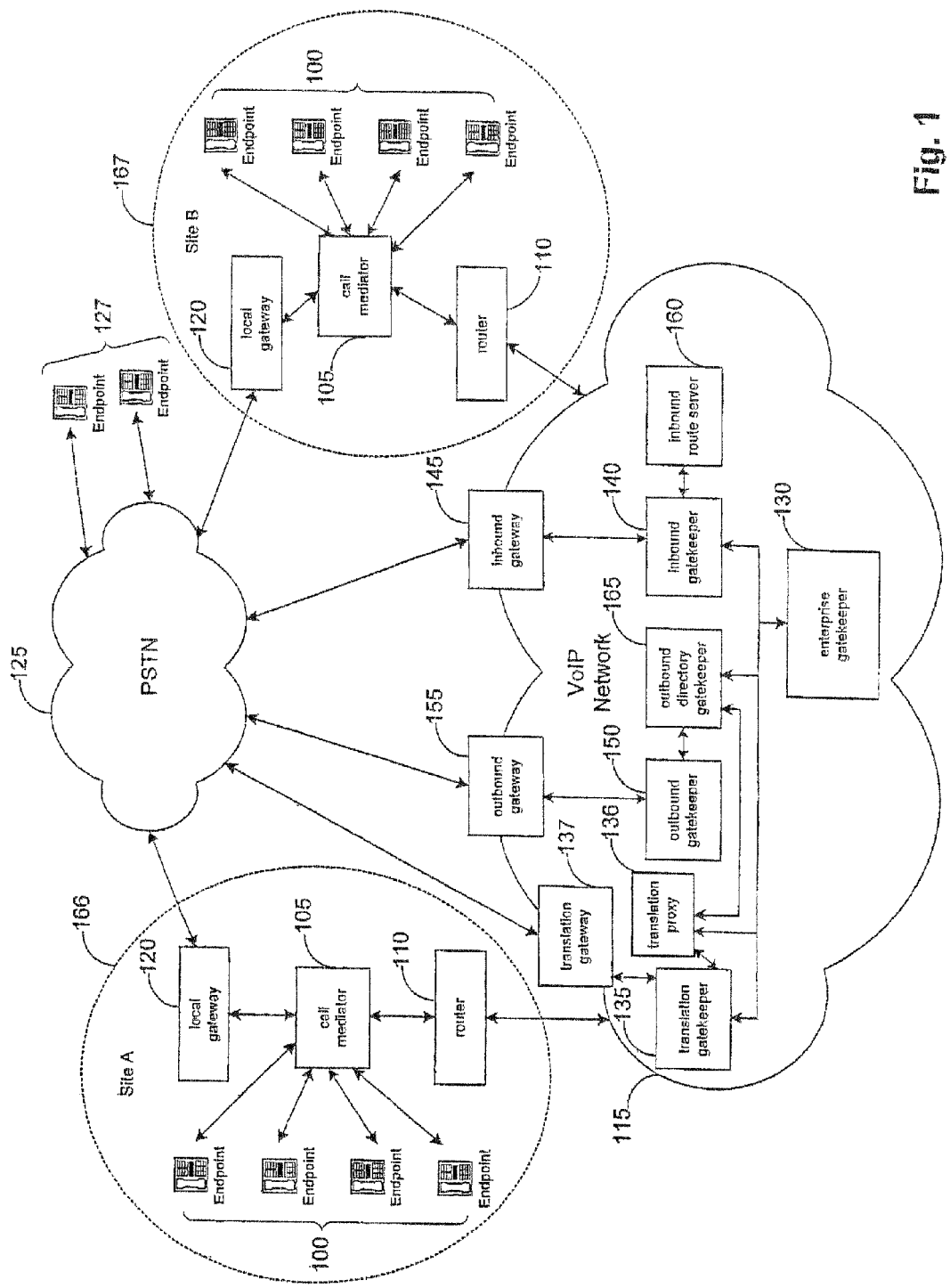
FIG. 1 presents a block diagram of an exemplary system for providing alternate routing via a VoIP network according to an embodiment of the invention.

With reference to FIGS. 1 through 6c, embodiments of the invention are presented. FIG. 1 presents a block diagram of an exemplary system for providing alternate routing via a VoIP network according to an embodiment of the invention. As shown, the system includes VoIP network endpoints 100, a call mediator 105, a router 110 connected to a packet-switched network such as a VoIP network 115, a local gateway 120 connected to a circuit-switched network 125 such as the PSTN, PSTN endpoints 127, an enterprise gatekeeper 130, a translation gatekeeper 135, a translation proxy server 136, a translation gateway 137, an inbound gatekeeper 140, an inbound gateway 145, an outbound gatekeeper 150, an outbound gateway 155, an inbound route server 160, an outbound directory gatekeeper 165, a first network site 166, and a second network site 167.

A VoIP network endpoint 100 is generally a network node comprising a network device suitable for conducting communications in a VoIP network, such as, a VoIP-enabled telephone handset, facsimile machine, video conferencing terminal, or other similar devices known in the art. In some embodiments, a VoIP network endpoint 100 may comprise a general-purpose computer with audio input and output capabilities suitable for conducting VoIP communications.

VoIP endpoints 100 generally maintain and execute client software to facilitate VoIP, as well as other types of communications. For example, according to one embodiment of the invention, VoIP endpoints 100 maintain and execute client software that adheres to the H.323 standard, which provides a foundation for audio, video, and data communications across IP-based networks 115. The H.323 standard and its related annexes, available from the H.323 Forum at www.h323forum.org and at the International Telecommunication Union at www.itu.int, is hereby incorporated herein by reference in its entirety. Additionally, H.323 is an umbrella standard that describes the architecture of the conferencing system and refers to a set of other standards (H.245, H.225.0, Q.931, and others) to describe its actual protocol. Alternatively, the system may be implemented using Session Initiation Protocol ("SIP"), Media Gateway Control Protocol ("MGCP"), or other well-known protocols for transporting voice and other related data over communications networks.

Each VoIP endpoint 100 is associated with one or more identifying network addresses. For example, in some embodiments a VoIP endpoint 100 is associated with an E.164 address as defined in the International Telecommunication Union's international public telecommunication numbering plan, available at http://www.itu.int/ITU-T/publications/index.html and hereby incorporated herein by reference in its entirety. Alternatively, in other embodiments, VoIP endpoints 100 are associated with IP addresses, H.323 IDs, SIP URLs, MGCP endpoint names, and other network address identifiers known in the art.

VoIP endpoints 100 are connected to a call mediator 105. The call mediator 105 is generally a software or hardware module, such as an IP-PBX, a PBX with a VoIP interface, a PBX fronted by a gateway, or other similar device that is generally responsible for handling intra-network communications. For example, the call mediator 105 generally handles calls between two endpoints 100 at the same enterprise site. The call mediator 105 is also generally responsible for presenting or otherwise delivering calls to other network elements in a private dialing plan ("PDP") format, in the PSTN-based format such as E.164 or prefixed-national, or other format suitable for routing through the VoIP network 115.

For example, an enterprise may have a private dialing plan that enables users to communicate with any endpoint in the enterprise using an abbreviated phone number, e.g.—a private number. Exemplary dialing plans use a 4 or 5 digit station number, with some unique prefix of the number identifying an enterprise site, and the remainder identifying an endpoint at that site. In some embodiments, the enterprise PDP also maps to a corresponding E.164 dialing plan which facilitates dialing enterprise endpoints from a PSTN. Thus, in some cases, each site prefix in a PDP may map to a starting E.164 number, and each endpoint's E.164 number is the sum of the starting E.164 number for the site and the endpoint number within the site.

For example, in one embodiment, site A 166 has site prefix 4 and site B has site prefix 5 in a private dialing plan of length 5. Further, site A's E.164 starting address is 17812620000 and site B's E.164 starting address is 17818650000. Accordingly, the E.164 equivalent for station 43210 is 17812620000+3210=17812623210. The E164 address for station 54321 is 17818650000+4321=17818654321. In some embodiments, a given site may actually have several private dialing plan prefixes, each with their own starting E.164 number.

In some embodiments, to distinguish PDP numbers from PSTN numbers when dialing from within the enterprise, a unique prefix such as '9' is used to signify that a PSTN number (in specified format such as E.164, national, prefixed-national, or local) follows. For example, prefixed-national format generally uses a unique prefix to indicate that a national significant number follows, per E.164 definitions. As another example, in the United States, the national access prefix is generally '1', so that any U.S. number can be dialed as 1+NPA+NXX+XXXX, the last 10 digits being the national significant number. Thus, national format is generally the national significant number. In other embodiments, dialing plans may require another unique prefix (e.g., '8') to indicate intersite dialing within the enterprise PDP, and require only the station suffix number for dialing stations intra-site.

The call mediator 105 is connected to a circuit-switched network 125, such as the PSTN, via a local gateway 120. Gateways, as described herein, generally function as an entrance or an exit to another network. Gateways, for example, translate IP-based communications to PSTN-based communications, or vice-versa, and serve as a bridge between these different network types. In some embodiments, a gateway has a PSTN interface connected to the PSTN 125 and an IP interface connected a VoIP network 115. In some embodiments, as further described herein, gateways also translate numbers and other network addresses by expanding or otherwise manipulating PDP numbers or other similar numbers dialed into formats suitable for transmission on a particular network such as a PSTN 125 or a VOIP network 115.

The local gateway 120 or overflow gateway enables the call mediator 105 to route calls directly to the PSTN 125 and to PSTN endpoints 127 by bypassing the VoIP network 115. PSTN endpoints 127 generally comprise but are not limited to traditional (non-VoIP) telephones, facsimile machines, and other similar devices known in the art.

The call mediator 105 is connected to a packet-switched network 115, such as a VoIP network, via a router 110. Communications from the call mediator 105 to the VoIP network 115 are generally received by the enterprise gatekeeper 130 for further processing.

The enterprise gatekeeper 130 functions as a management component for the system and, among other things, is generally responsible for providing communication routing and control decisions to various elements of the system such as call mediators 105, translation gatekeepers 135, inbound gatekeepers 140, inbound gateways 145, outbound gatekeepers 150, outbound gateways 155, inbound route servers 160, outbound directory gatekeepers 165, and other devices or software modules. For example, the enterprise gatekeeper 130, based on the called number received from a call mediator 105, provides the functionality to route the call to the IP address or other network identifying address of the destination endpoint 100. In some embodiments, the enterprise gatekeeper 130 may be connected to an enterprise gateway (not shown) fronting a legacy PBX or other similar element, and which provides, among other things, ISDN to IP translation and number translation capabilities for calls to and from the enterprise site. The enterprise gatekeeper 130 is also generally connected to a translation gatekeeper 135 in communication with a translation gateway 137 which passes a call directly from the translation gatekeeper 135 to the PSTN 125, as further described herein. The translation gateway 137 provides, among other things, number expansion functionality for private dial plans by expanding abbreviated PDP called numbers to E.164 format before delivery to the PSTN 125.

In some embodiments, the enterprise gatekeeper 130 is also generally connected to a translation proxy server 136. The translation proxy server 136 receives calls generally intended for the translation gatekeeper 135 and relaunches these calls using an outbound directory gatekeeper 165 as further described herein. For example, in some embodiments, the translation proxy server receives calls requiring translation, performs required translations, and routes calls to the PSTN via an outbound directory gatekeeper connected to an outbound gatekeeper and an outbound gateway as further described herein. In some embodiments, the translation proxy server 136 receives calls from a translation gatekeeper 136 to be routed via an outbound directory gatekeeper 165, for example when a translation gateway 137 is unavailable. The translation proxy server 136 provides similar number expansion functionality as a translation gateway including, among other things, number expansion functionality for private dial plans by expanding abbreviated PDP called numbers to E.164 format before delivery to the outbound directory gatekeeper 165 and the PSTN 125.

The enterprise gatekeeper 130 is also generally connected to an inbound gatekeeper 140. The inbound gatekeeper 140 receives communications from the PSTN 125 via an inbound gateway 145, and routes these communications into the VoIP network 115. Based on the dialed number of the communication, the inbound gatekeeper 140 provides other elements of the system, such as the inbound gateway 145, with the intended destination endpoint's 100 IP address or other network identifying address needed to route the communication to the destination via the VoIP network 115. The inbound gatekeeper 140 provides the intended destination endpoint's 100 IP address or other network identifying address by consulting a route table or other data structure stored in memory accessible to the inbound gatekeeper 140.

In some embodiments, the inbound gatekeeper 140 communicates with the inbound route server 160 to obtain the intended destination endpoint's 100 IP address or other network identifying address. For example, in some embodiments, a route table or other data structure stored in memory, such as a cache, at the inbound route server 160 is used to obtain the intended destination endpoint's 100 IP address or other network identifying address. The data route table or other data structure comprises a map correlating network endpoints 100 with IP addresses or other network identifying addresses. In some embodiments, a configuration manager for internet telephony ("CoMIT"), as further described in application Ser. No. 09/452,915, titled MULTISERVICE NETWORK, filed Dec. 1, 1999, which is hereby incorporated by reference in its entirety, generates a network mapping or other network data used by the inbound route server 160 to perform address lookups.

In some embodiments, the CoMIT also generates network mappings and other network data used by other system components including, but not limited to, outbound directory gatekeepers 165, enterprise gatekeepers 130, call mediators 105, VoIP network endpoints 100, routers 110, local gateways 120, a translation gatekeepers 135, translation proxies 136, translation gateways 137, inbound gatekeepers 140, inbound gateways 145, outbound gatekeepers 150, outbound gateways 155, and other system components.

The enterprise gatekeeper 130 is also generally connected to an outbound directory gatekeeper 165 in turn connected to an outbound gatekeeper 150. The outbound directory gatekeeper 165 receives communications from the enterprise gatekeeper 130 or other system element, and routes these communications to the PSTN via an outbound gatekeeper 150 and an outbound gateway 155. Based on the dialed number of the communication, the outbound directory gatekeeper 165, via the outbound gatekeeper 150, provides other elements of the system with the IP address or other network identifying address of the appropriate outbound gateway 155 using the least cost routing algorithms and other systems and methods further described in application Ser. No. 09/827,352 and now pending.

The outbound directory gatekeeper 165 and the outbound gatekeeper 150 provide the address of the appropriate outbound gateway 155 by consulting a route table or other data structure stored in memory accessible to the outbound directory gatekeeper 165 and outbound gatekeeper 150 that maps E.164 numbers to IP addresses of outbound gateways 155. In some embodiments, the CoMIT, as further described in application Ser. No. 09/452,915, generates a network mapping and other network data used by the outbound directory gatekeeper 165 to perform address lookups. In some embodiments, the outbound directory gatekeeper 165 and outbound gatekeeper 150 provide a route to the intended destination endpoint 100 based on least cost routing decisions. For example, in some embodiments, the outbound directory gatekeeper 165 and outbound gatekeeper 150 provide least cost routing decisions according to systems and methods further described in application Ser. No. 09/827,352 and now pending.

Figure 2:
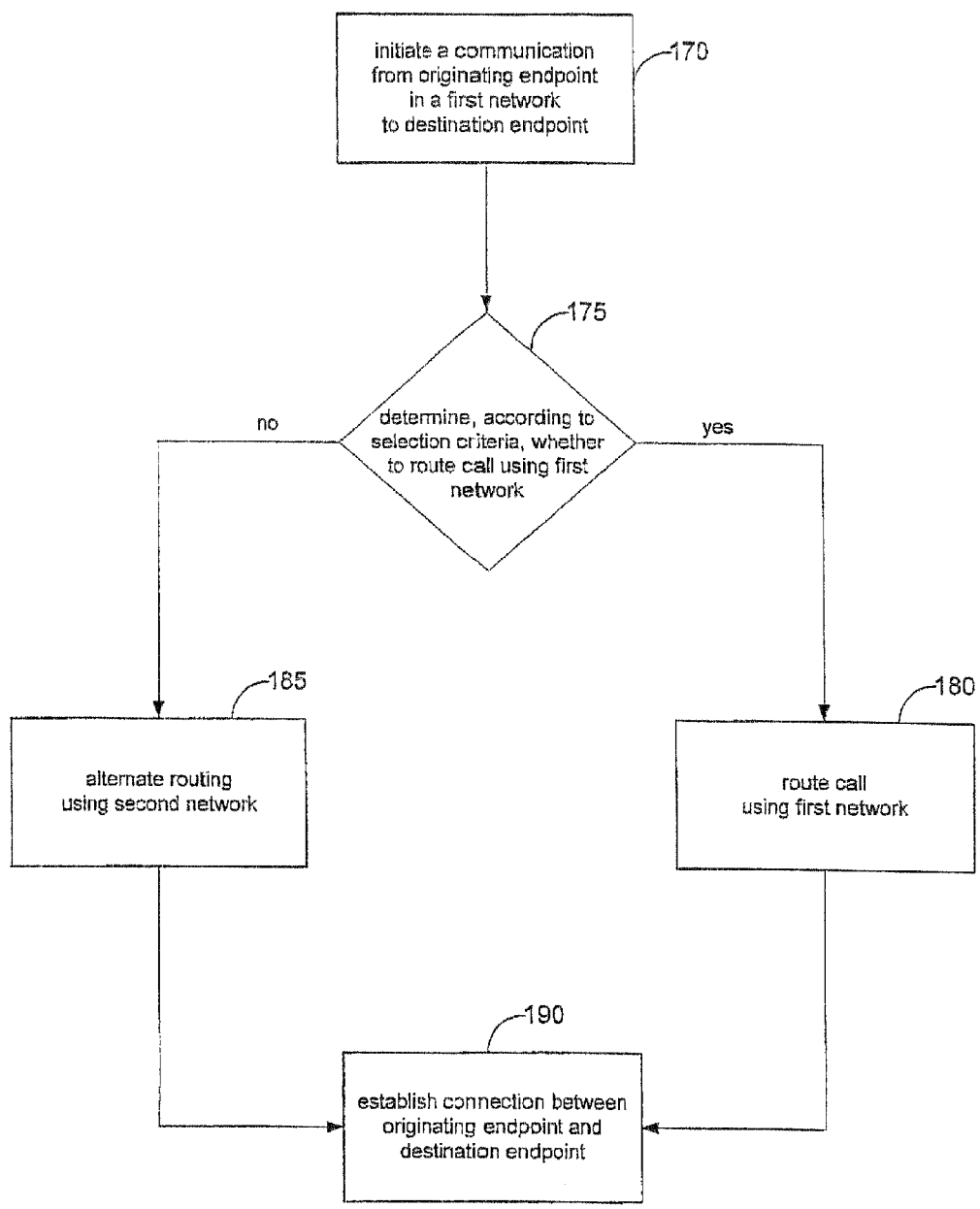
FIG. 2 presents a flow diagram of a method for providing alternate routing in a network according to an embodiment of the invention.

FIG. 2 presents a flow diagram of a method for providing alternate routing in a network according to an embodiment of the invention. A communication is initiated from an origination endpoint in a first network to a destination endpoint, step 170. For example, in a VoIP network, a call could be initiated between a first VoIP network endpoint, such as a VoIP-enabled telephone, and a second VoIP network endpoint. As another example, a call could be initiated between a traditional or "dumb" telephone handset in a PSTN and a VoIP network endpoint, such as a VoIP-enabled telephone, facsimile machine, terminal, or other similar device. It will be apparent to one skilled in the art that other permutations are possible within the scope of the system.

The system determines, according to selection criteria, whether to route the call using the first network, step 175. For example, the system might only route a call via a VoIP network if sufficient end-to-end bandwidth is available to ensure a certain level of quality of service ("QoS") for the call. If the selection criteria are satisfied, the system routes the communication using the first network, step 180. Alternatively, if the selection criteria are not satisfied, step 175, the system routes the communication using at least a second alternate network, step 185. Thus, continuing the previous example, if sufficient bandwidth is not available, the system might route the call using the PSTN instead of the VoIP network. The system then establishes a connection for the communication between the origination endpoint and the destination endpoint, step 190.

Figure 3A:
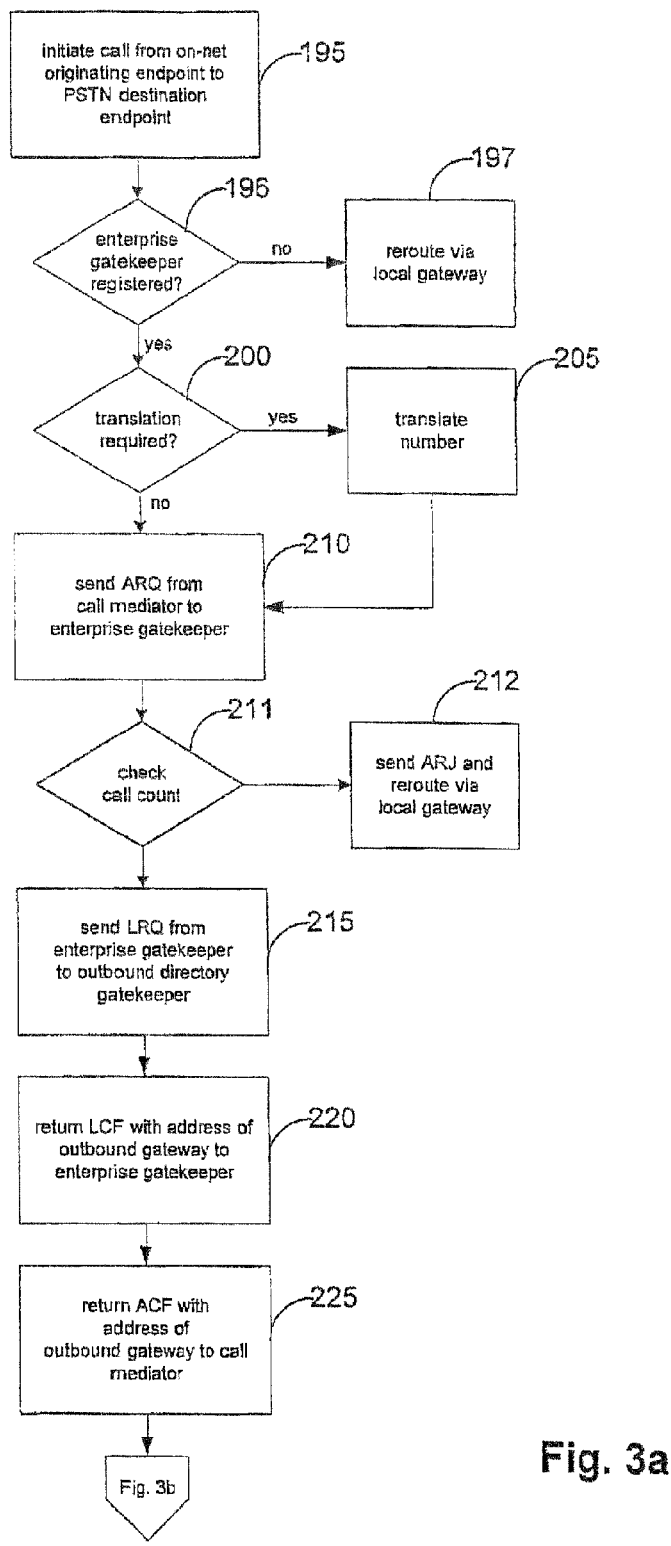
FIGS. 3a and 3b present flow diagrams of a method for providing alternate routing between an origination endpoint on a VoIP network and a destination endpoint on the PSTN according to an embodiment of the invention.
Figure 3B:
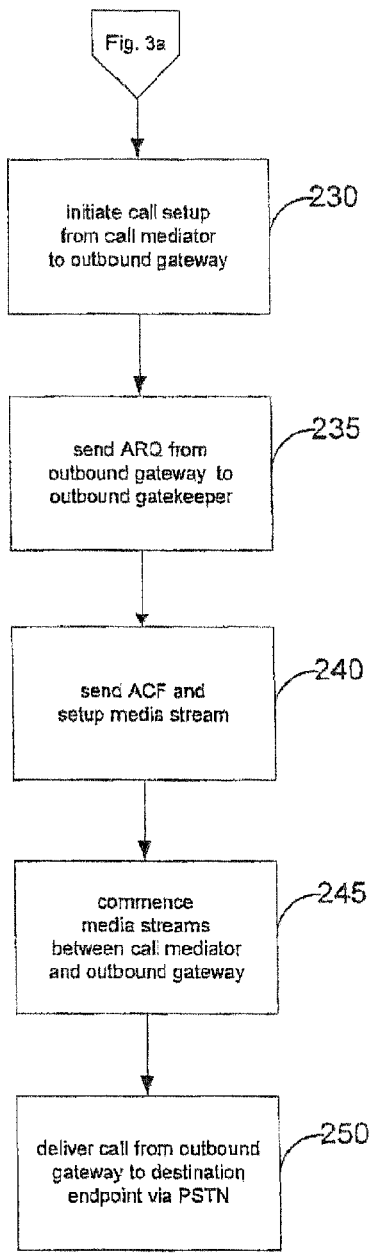

FIGS. 3a and 3b present flow diagrams of a method for providing alternate routing between an origination endpoint on a VoIP network and a destination endpoint on the PSTN according to one embodiment of the invention. The system initiates a communication from an on-net origination endpoint, such as a VoIP endpoint, to an offnet destination endpoint, such as a PSTN endpoint, step 195. For example, a user could use a VoIP-enabled phone to dial a number directed to a traditional telephone base unit on the PSTN.

A call mediator checks to determine if an enterprise gatekeeper is registered or can otherwise be located, step 196. For example, the call mediator may consult a network mapping or other data structure stored in memory accessible to the call mediator that indicates available network components, such as enterprise gatekeepers, associated with the call mediator. If no enterprise gatekeeper can be located, the call mediator reroutes the call using the local gateway, step 197.

The call mediator (or in some embodiments, an enterprise gateway) determines whether the destination endpoint number of the communication should be translated before being sent to the enterprise gatekeeper or other system components, step 200, and if necessary, translates the number into an appropriate format, step 205. Multiple call mediators from different enterprise sites or even different enterprises may share the services of the same enterprise gatekeeper and other system components. Thus, in some embodiments, the system requires a unique customer-specific identifier ("CSID") prepended to all private dialing plan numbers in order to identify the endpoints associated with the each specific call mediator. The CSID is used by the enterprise gatekeeper and other system components to distinguish between different customers, enterprises, sites, and call managers. Otherwise, for example, two different customers might be using the same numbers for their PDPs, and without the CSID, the enterprise gatekeeper receiving a PDP number such as "5678" would have difficulty distinguishing which customer's endpoint associated with "5678" was the actual intended recipient of a communication. CSIDs are thus associated with call managers and stored in memory accessible to the enterprise gatekeeper. In some embodiments, the call mediator prepends a CSID to all calls before sending them to the enterprise gatekeeper.

Further, in some embodiments, the system also requires a technology prefix added to numbers that might be routed to other networks, such as the PSTN. For example, in some embodiments, the call mediator prepends a technology prefix such as "96#" to all numbers intended for the PSTN. The enterprise gateway and other elements recognize the technology prefix, and provide additional routing services as further described herein. In some embodiments, the call mediator also formats PDP numbers as an E.164 address so that, among other things, calls can be alternately routed to the PSTN to complete the communication.

As further described herein, the system uses a number of standards including H.323, H.225, H.245, and other protocol signaling techniques known in the art to facilitate communications between system components. The call mediator sends an admission request ("ARQ") message to the enterprise gatekeeper requesting access to the VoIP network, step 210. The ARQ sent to the enterprise gatekeeper includes the number of the PSTN destination endpoint.

The enterprise gatekeeper determines, according to selection criteria, whether there are sufficient resources to route the call, step 211. In some embodiments, selection criteria include bandwidth exceeding a specified amount, availability of system components, and other criteria useful in determining whether to route a communication. For example, the enterprise gatekeeper might determine whether there is sufficient bandwidth available to enable a voice or other media stream at a specified minimal QoS. For example, in some embodiments, the enterprise gatekeeper evaluates QoS by tracking the call counts it processes and other information to determine whether there is sufficient bandwidth or other network resources to handle a call. If the call counts are over a specified limit, then the enterprise gatekeeper returns an admission rejection ("ARJ") to the call mediator and the call is rerouted by the call mediator via the local gateway. Alternatively, the system might check to ensure that various system resources such as gatekeepers, gateways, routers, and other system components are available to route the call to its intended destination. In some embodiments, the outbound gatekeeper communicates with the enterprise gatekeeper or the call mediator to determine whether there are sufficient resources to setup the call. Thus, if the enterprise gatekeeper determines that sufficient resources do not exist to setup the call, then the enterprise gatekeeper communicates an ARJ to the call mediator that the call should be routed directly to the PSTN via a local gateway, step 212.

The enterprise gatekeeper forwards the number of the PSTN destination endpoint in a location request ("LRQ") message to the outbound directory gatekeeper to locate an appropriate outbound gateway to deliver the call to the PSTN, and, based on least cost routing decisions further described herein, for example those described in application Ser. No. 09/827,352, the outbound directory gatekeeper selects the appropriate outbound gateway to deliver the call to the PSTN, step 215. The outbound directory gatekeeper then returns the IP address or other network identifying address of the selected outbound gateway to the enterprise gatekeeper in a location confirm ("LCF") message, step 220. The enterprise gatekeeper in turn sends the address of the selected outbound gateway to the call mediator in an admission confirm ("ACF") message, step 225.

Continuing with FIG. 3b, the enterprise gatekeeper directs the call mediator to initiate an H.225 call setup with the selected outbound gateway according to techniques known in the art and further described herein, step 230. The call mediator contacts the outbound gateway to setup the call, and the outbound gateway sends an ARQ to the outbound gatekeeper requesting a call setup, step 235.

The outbound gatekeeper returns an ACF to the outbound gateway, and an H.245 media stream setup commences between the call mediator and the outbound gateway, step 240. Real time transport protocol ("RTP") voice streams or other voice streams begin between the call mediator and the outbound gateway, step 245, and the outbound gateway delivers the call to the destination endpoint via the PSTN, step 250. The real time transport protocol is a protocol that specifies a method for programs to manage transmission of multimedia data, and is further described in the Internet Engineering Task Force ("IETF") Request for Comments ("RFC") 1889, available at http://www.ietf.org/rfc/rfc1889.txt, which is hereby incorporated herein by reference in its entirety.

Figure 4A:
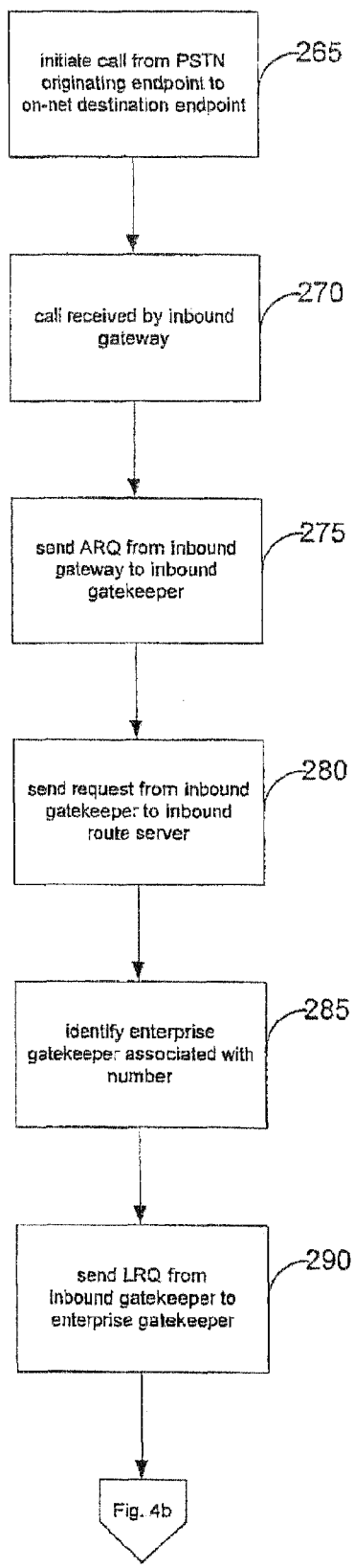
FIGS. 4a, 4b, and 4c present flow diagrams of a method for providing alternate routing between a PSTN origination endpoint and a VoIP network endpoint according to an embodiment of the invention.
Figure 4B:
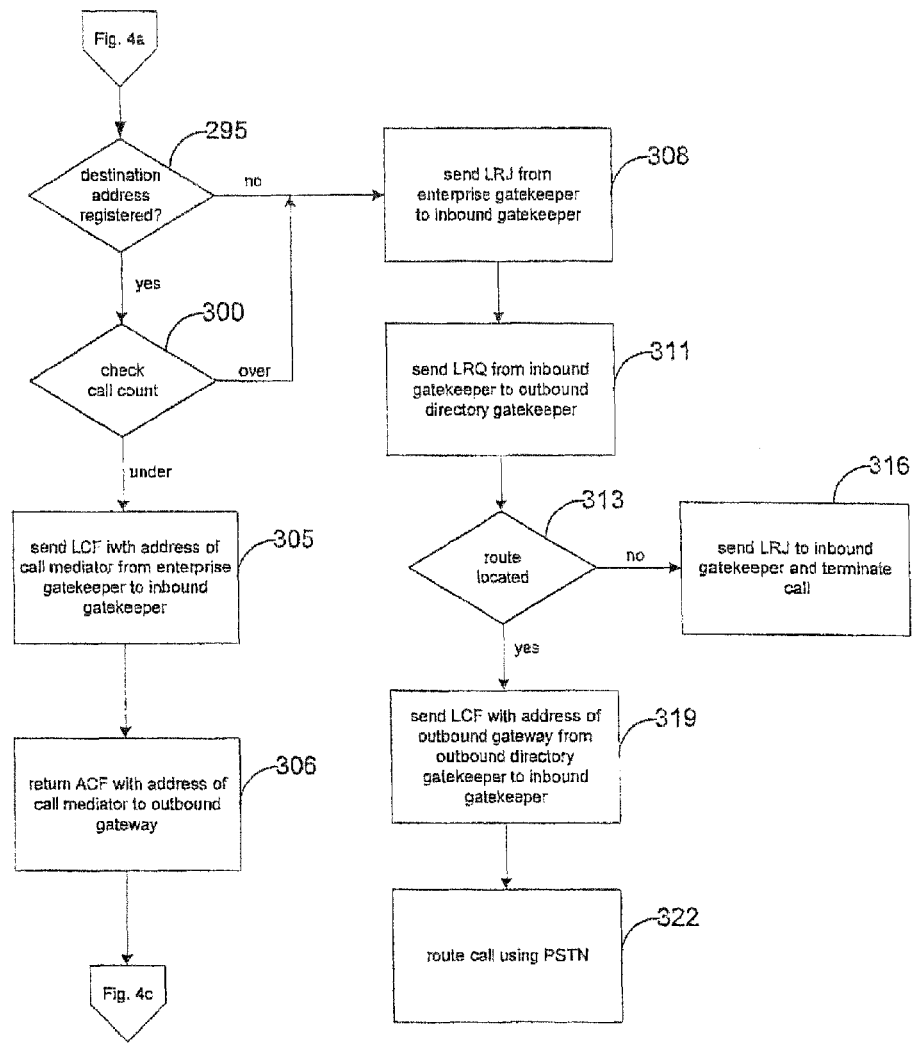
Figure 4C:
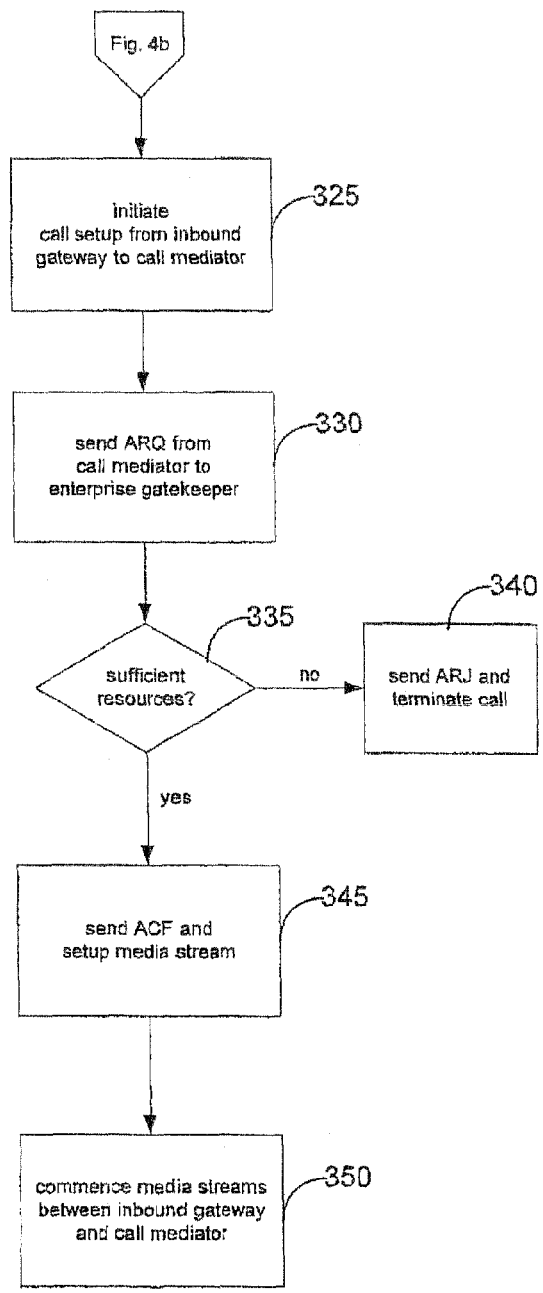

FIGS. 4a, 4b, and 4c present flow diagrams of a method for providing alternate routing between a PSTN origination endpoint and a VoIP network endpoint according to an embodiment of the invention. The system initiates a communication from an off-net origination endpoint, such as a PSTN endpoint, to an on-net destination endpoint, such as a VoIP endpoint, step 265. For example, a user could use a traditional telephone base unit on the PSTN to dial a number directed to a VoIP-enabled phone or other device on the VoIP network.

The communication is received by an inbound gateway connected to the PSTN, step 270. In some embodiments, the communication is directed to a direct inward dial ("DID") number associated with a VoIP endpoint. DID numbers generally consist of public telephone system numbers mapped to VoIP endpoints of the system. For example, a company might have a block of DID numbers associated with its VoIP endpoints.

In some embodiments, the inbound gateway translates a DID number to an alternate PSTN-only E.164 equivalent (as opposed to solely a DID number) for additional routing options. Thus, as further described herein, if a communication cannot be completed using the VoIP network, the inbound gateway can complete the call using translated E.164 alternate number via the PSTN. In other embodiments, as further described herein, the inbound gateway concatenates or otherwise translates the DID number to include a CSID or a technical prefix to facilitate locating the call mediator associated with the destination endpoint.

The inbound gateway requests access to the VoIP network for the communication, and sends an ARQ containing at least the number of the destination endpoint to an inbound gatekeeper, step 275. The inbound gatekeeper sends a request to an inbound route server to determine a path to the enterprise gatekeeper associated with the destination endpoint, step 280. As previously discussed herein, the inbound route server consults a system map or other data structure representing associations between endpoints and enterprise gatekeepers, and selects an enterprise gatekeeper associated with the destination VoIP endpoint and communicates this information to the inbound gatekeeper, step 285. The inbound gatekeeper sends an LRQ to the enterprise gatekeeper that contains the E.164 address or other network identifying address associated with the destination VoIP endpoint, step 290.

The enterprise gatekeeper consults a system map or other data structure representing associations between endpoints and enterprise gatekeepers to determine whether the destination endpoint identifying address is registered with the enterprise gatekeeper, step 295. The enterprise gatekeeper also determines, according to selection criteria, whether there are sufficient resources to route the call as previously described herein, step 300. For example, the enterprise gatekeeper might check the number of call counts to ensure that they are under a specified threshold before proceeding to route the call.

If the destination endpoint is identified and sufficient resources exist, then the enterprise gatekeeper sends the inbound gatekeeper an LCF containing the IP address or other network identifier of the destination endpoint and, in some cases, of a call mediator associated with the destination endpoint, step 305. The inbound gatekeeper returns to the inbound gateway an ACF containing the IP address or other network address of the destination endpoint or call mediator, step 306. If the destination endpoint cannot be identified or sufficient resources do not exist then the enterprise gatekeeper returns a location rejection ("LRJ") message to the inbound gatekeeper, step 308.

In some embodiments, the inbound gatekeeper attempts to alternately route the call and sends an LRQ containing the IP address or other network identifying address of the destination endpoint to an outbound directory gatekeeper, step 311.

The outbound directory gatekeeper attempts to locate a route to the destination endpoint by consulting network mappings or other data structures stored in memory accessible to the outbound directory gatekeeper as further described herein, step 313. If the outbound directory gatekeeper cannot locate a route to the destination address, then the outbound directory gatekeeper returns an LRJ to the inbound gatekeeper and the call terminates, step 316. Otherwise, the outbound directory gatekeeper returns an LCF to the inbound gatekeeper, step 319 containing the address of an outbound gateway that will route the call via the PSTN as further described herein, step 322.

Turning to FIG. 4c, if the call is routable via the enterprise gatekeeper, the inbound gatekeeper returns an ACF to the inbound gateway, and the an H.225 call setup is initiated between the inbound gateway and the call mediator associated with the destination endpoint as known in the art and further described herein, step 325.

The call mediator sends an ARQ to the enterprise gateway requesting a call setup, step 330. The enterprise gatekeeper determines, according to selection criteria, whether there are sufficient resources to setup the call via the VoIP network, step 335. In some embodiments, selection criteria include bandwidth exceeding a specified amount, availability of system components, and other criteria useful in determining whether to route a communication. For example, the enterprise gatekeeper might determine whether there is sufficient bandwidth available to enable a voice or other media stream at a specified minimal QoS. For example, the enterprise gatekeeper might track call counts to evaluate bandwidth as further described herein. Alternatively, the system might check to ensure that various system resources such as gatekeepers, gateways, routers, and other system components were available to route the call to its intended destination.

If the enterprise gatekeeper determines that sufficient resources do not exist to setup the call, then the enterprise gatekeeper communicates an ARJ to the call mediator that the call cannot be routed via the VoIP network and should either fail or be routed directly to the PSTN using the alternate E.164 equivalent or other similar number if available, step 340. The call mediator then communicates to the inbound gateway that the inbound gateway is now responsible for either routing the call to the PSTN or terminating the call.

If sufficient resources exist, however, the enterprise gatekeeper sends an ACF to the call mediator, and an H.245 media stream setup commences between the call mediator and the inbound gateway, step 345. RTP voice streams or other voice streams begin between the call mediator and the inbound gateway, and the call mediator routes the stream to the destination endpoint, step 350.

Figure 5A:
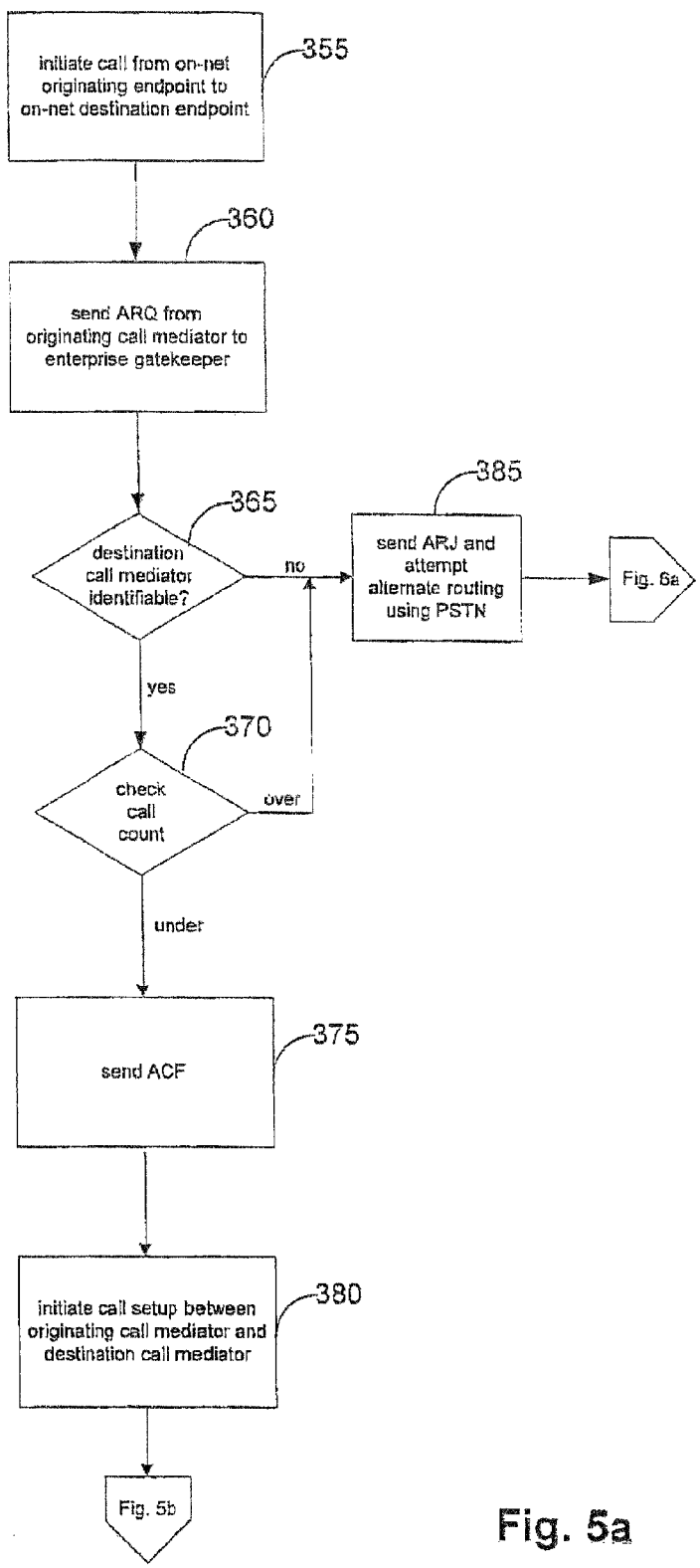
FIGS. 5a and 5b present flow diagrams of a method for providing alternate routing, between VoIP network endpoints according to an embodiment of the invention.
Figure 5B:
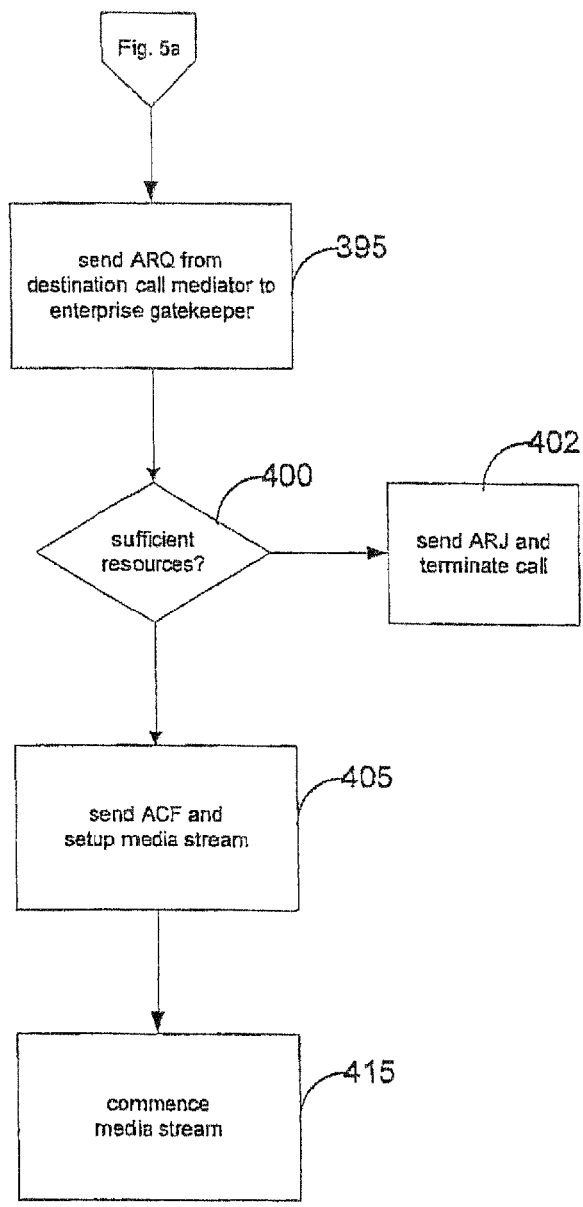

FIGS. 5a and 5b present flow diagrams of a method for providing alternate routing between VoIP network endpoints according to an embodiment of the invention. The system initiates a communication from an on-net origination endpoint, such as a VoIP endpoint, to an on-net destination endpoint, such as another VoIP endpoint, step 355. For example, a user could use a VoIP-enabled phone to dial a number directed to another VoIP-enabled phone on a VoIP network.

The call mediator sends an ARQ to the enterprise gatekeeper requesting access to the VoIP network, step 360. The ARQ sent to the enterprise gatekeeper includes the number of the VoIP destination endpoint. As previously described herein, the enterprise gatekeeper consults network mappings and determines whether a call mediator associated with the destination endpoint can be identified to route the call, step 365.

If a call mediator associated with the destination endpoint is identified, the enterprise gatekeeper also determines, according to selection criteria, whether there are sufficient resources to route the call as previously described herein, step 370. For example, the enterprise gatekeeper might check the number of call counts to ensure that they are under a specified threshold before proceeding to route the call.

Figure 6A:
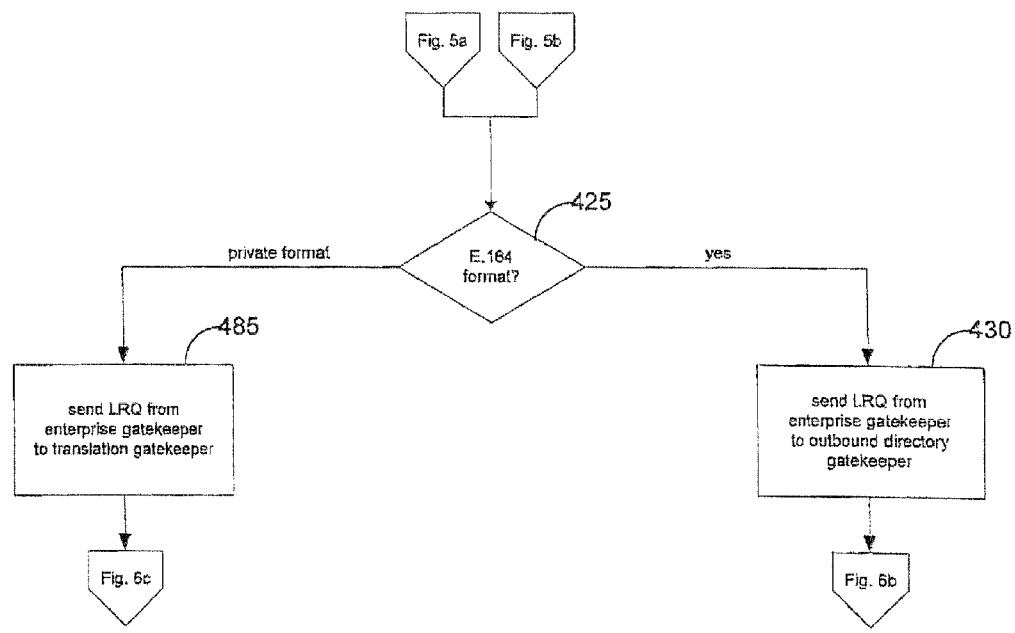
FIGS. 6a, 6b, and 6c present flow diagrams that continue the method for providing alternate routing between VoIP network endpoints according to an embodiment of the invention begun in FIGS. 5a and 5b.
Figure 6B:
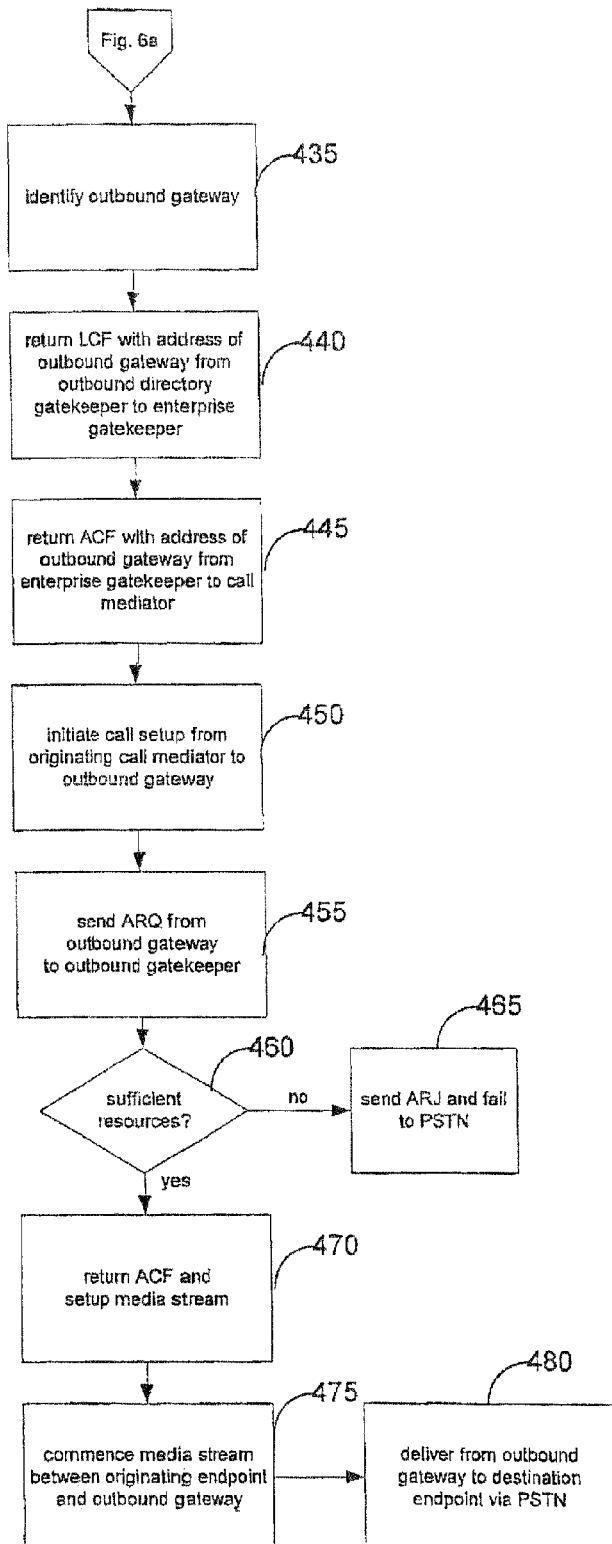
Figure 6C:
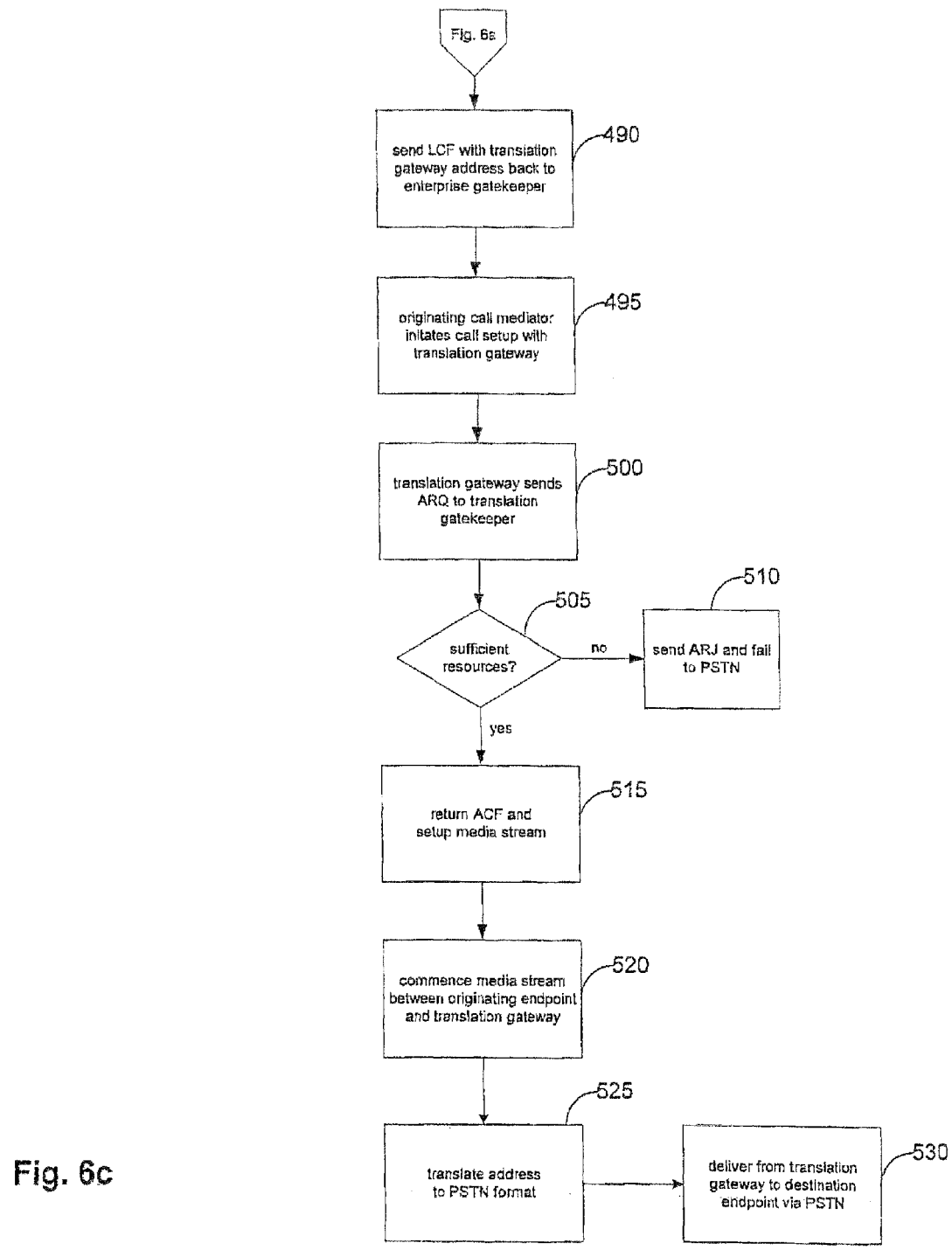

If the enterprise gatekeeper cannot identify the destination call mediator or determines that sufficient resources do not exist to setup the call, then the enterprise gatekeeper communicates an ARJ to the call mediator that the call cannot be routed via the VoIP network, and should be alternately routed via the PSTN as further described in FIGS. 6a-6c and elsewhere herein, step 385. In some embodiments, the enterprise gatekeeper communicates an ARJ to the call mediator indicating that the call mediator is responsible for the call and that the communication should either fail or be routed by the call mediator via a local gateway directly to the PSTN using an alternate E.164 equivalent number or other similar number if available.

If sufficient resources exist, however, the enterprise gatekeeper sends to the call mediator associated with the origination endpoint an ACF containing the IP address or other identifying network address of the call mediator associated with the destination endpoint, step 375, and an H.245 media stream setup commences between the call mediator associated with the origination endpoint and the call mediator associated with the destination endpoint, step 380.

Turning to FIG. 5b, the call mediator associated with the destination endpoint sends and ARQ to the enterprise gateway, step 395.

The enterprise gatekeeper determines, according to selection criteria, whether there are sufficient resources to setup the call via the VoIP network, step 400. In some embodiments, selection criteria include bandwidth exceeding a specified amount, availability of system components, and other criteria useful in determining whether to route a communication. For example, the enterprise gatekeeper might determine whether there is sufficient bandwidth available to enable a voice or other media stream at a specified minimal QoS. For example, the enterprise gatekeeper might track call counts to evaluate bandwidth as further described herein. Alternatively, the system might check to ensure that various system resources such as gatekeepers, gateways, routers, and other system components were available to route the call to its intended destination.

If the enterprise gatekeeper determines that sufficient resources do not exist to setup the call, then the enterprise gatekeeper communicates an ARJ to the call mediator that the call cannot be routed via the VoIP network and should either fail or be routed directly to the PSTN using the alternate E.164 equivalent or other similar number if available, step 402. The call mediator then communicates to the inbound gateway that the inbound gateway is now responsible for either routing the call to the PSTN or terminating the call.

If sufficient resources do exist, however, the enterprise gatekeeper sends an ACF to the call mediator associated with the destination endpoint, and an H.245 media stream setup commences between the call mediator associated with the origination endpoint and the call mediator associated with the destination endpoint, step 405. An RTP voice stream or other voice stream begins between the two call mediators, and the call mediators route the stream to their respective endpoints, step 415.

FIGS. 6a, 6b, and 6c present flow diagrams that continue the method for providing alternate routing between VoIP network endpoints according to an embodiment of the invention begun in FIGS. 5a and 5b. The enterprise gateway determines whether the number for the VoIP destination endpoint is in a format, such as E.164, suitable for routing via an alternate network such as a PSTN, step 425. For example, the call mediator may already have translated a PDP number or otherwise provided alternate routing information for the communication. Alternatively, the number itself might originally have been in a format, such as E.164, suitable for routing to an alternate network, such as a PSTN, and required no translation by the call mediator.

If the address is in a suitable format such as E.164 or another format, the enterprise gatekeeper sends to an outbound directory gatekeeper an LRQ containing the address associated with the destination endpoint, step 430. As previously described herein and in application Ser. No. 09/827, 352, the outbound directory gatekeeper selects, according to least cost routing criteria, available resource criteria, and other criteria, an outbound gateway to route the communication to the destination endpoint, step 435 (FIG. 6b). The outbound directory gatekeeper sends the enterprise gatekeeper an LCF containing the IP address or other network identifying address of the selected outbound gateway, step 440, and the enterprise gatekeeper in turn sends an ACF to the call mediator containing the address of the selected outbound gateway, 445.

The enterprise gatekeeper directs the call mediator to initiate an H.225 call setup with the selected outbound gateway as known in the art and further described herein, step 450. The call mediator contacts the outbound gateway to setup the call, and the outbound gateway sends an ARQ to the outbound gatekeeper requesting a call setup, step 455.

As previously described herein, the outbound gatekeeper determines, according to selection criteria, whether there are sufficient resources to setup the call via the VoIP network, step 460. In some embodiments, the outbound gatekeeper communicates with the enterprise gatekeeper or the call mediator to determine whether there are sufficient resources to setup the call.

If the outbound gatekeeper determines that sufficient resources do not exist to setup the call, then the outbound gatekeeper communicates an admission rejection ("ARJ") message to the outbound gateway that the call should be routed directly to the PSTN via a local gateway as previously described herein, step 465. The outbound gateway then communicates to the call mediator that the call mediator is now responsible for routing the call to the PSTN, for example via a local gateway.

If sufficient resources exist, however, the outbound gatekeeper sends an ACF to the outbound gateway, and an H.245 media stream setup commences between the call mediator and the outbound gateway, step 470. A RTP voice stream or other media stream begins between the call mediator and the outbound gateway, step 475, and the outbound gateway delivers the call to the destination endpoint via the PSTN, step 480.

Returning to FIG. 6a, if the address is not in a suitable format, such as E.164 format, for routing via an alternate network, the enterprise gatekeeper sends to a translation gatekeeper an LRQ containing the address associated with the destination endpoint, step 485. For example, the address might be in PDP format. As previously discussed, the translation gatekeeper is generally connected to a translation gateway which provides, among other things, number expansion functionality for private dial plans by expanding abbreviated PDP called numbers to E.164 format before delivery to the PSTN. The translation gateway also passes calls directly from the translation gatekeeper to the PSTN.

In some alternate embodiments, the enterprise gatekeeper, instead of passing calls to a translation gatekeeper, passes calls requiring translation to the PSTN via a translation proxy server. The translation proxy server accepts calls generally intended for the translation gatekeeper and relaunches these calls using an outbound directory gatekeeper as further described herein. The translation proxy server provides similar number expansion functionality as a translation gateway including, among other things, number expansion functionality for private dial plans by expanding abbreviated PDP called numbers to E.164 format before delivery to the outbound directory gatekeeper 165 and the PSTN 125. The translation proxy server translates the number to a suitable format and forwards it to the outbound directory gatekeeper. The outbound directory gatekeeper routes the call to its destination via the PSTN using an outbound gateway and outbound gateway as further described herein.

Turning to FIG. 6c, the translation gatekeeper selects an appropriate translation gateway (or in some embodiments an outbound gateway) to route the communication to the PSTN, and send the enterprise gatekeeper an LCF containing the IP address or other network identifying address of the selected translation gateway, step 490. The enterprise gatekeeper in turn directs the originating call mediator to initiate an H.225 call setup with the selected translation gateway as known in the art and further described herein, step 495. The call mediator contacts the translation gateway to setup the call, and the translation gateway sends an ARQ to the translation gatekeeper requesting a call setup, step 500.

The translation gatekeeper determines, according to selection criteria, whether there are sufficient resources to setup the call via the VoIP network as further described herein, step 505. In some embodiments, the translation gatekeeper communicates with the enterprise gatekeeper or the call mediator to determine whether there are sufficient resources to setup the call.

If the translation gatekeeper determines that sufficient resources do not exist to setup the call, then the translation gatekeeper communicates an ARJ to the translation gateway that the call should be routed directly to the PSTN via a local gateway as previously described herein, step 510. The translation gateway then communicates to the call mediator that the call mediator is now responsible for routing the call to the PSTN.

If sufficient resources exist, however, the translation gatekeeper sends an ACF to the translation gateway, and an H.245 media stream setup commences between the call mediator and the translation gateway, step 515. An RTP voice stream or other media stream begins between the call mediator and the translation gateway, step 520, the translation gateway translates the number into a suitable format, such as the E.164 format, step 525, and the translation gateway delivers the call to the destination endpoint via the PSTN, step 530.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the embodiments of the invention have been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A non-transitory computer-readable medium with computer-executable instructions stored thereon, the computer-executable instructions, when executed by a processing device in a network, enabling the processing device to establish a telephone call from an origination endpoint to a destination endpoint by performing the operations of:
   receiving a destination telephone number at a gatekeeper in a packet-switched network, the destination telephone number being in a private dialing plan (PDP) format associated with a site corresponding to the destination endpoint;
   determining whether to route the telephonic call using the packet-switched network or a circuit-switched network based on network selection criteria, wherein the selection criteria includes an available bandwidth measurement, and the available bandwidth measurement is based on a comparison of a number of call counts processed by an enterprise gatekeeper with a specified threshold;
   appending a site identifier to the PDP number that identifies the site of the destination telephone endpoint; and
   based on the site identifier, initiating a connection to the destination endpoint over the circuit-switched network using the destination telephone number, and initiating call setup procedures at an outbound gateway.

2. The non-transitory computer-readable medium as recited in claim 1, wherein the selection criteria includes a network resource availability measurement.

3. A gatekeeper for facilitating alternate routing of communications in a packet-switched network, the gatekeeper comprising:
   a memory for storing instructions;
   a processing module coupled to the memory, and configured to transceive call routing information with a call mediator in the packet-switched network;
   wherein the call routing information is associated with a call initiation request sent from an origination endpoint to a destination endpoint, the origination endpoint being associated with an origination enterprise and the destination endpoint being associated with a destination enterprise, the origination enterprise and the destination enterprise associated with a private dialing plan (PDP) over the packet-switched network;
   wherein the processing module is configured to determine, according to selection criteria, whether to route the communication from the origination endpoint to the destination endpoint over a circuit-switched network, wherein the selection criteria includes an available bandwidth measurement, and the available bandwidth measurement is based on a comparison of a number of call counts processed by an enterprise gatekeeper with a specified threshold; and wherein the processing module is further configured to route the communication to the destination endpoint via the circuit-switched network based on a customer-specific identifier (CSID) received from the call mediator, the CSID having been appended to a PDP number associated with the communication by the call mediator;

wherein the processing module is further configured to cause the call mediator to initiate call setup procedures at an outbound gateway in the packet-switched network, wherein the call is to be set UP between the origination endpoint and the destination endpoint.

4. The gatekeeper as recited in claim 3, wherein the processing module is further configured to provide an address of the outbound gateway to the call mediator.

5. The gatekeeper as recited in claim 3, wherein the selection criteria includes a network resource availability measurement.

6. A call mediator for facilitating alternate routing of communications in a packet-switched network, the call mediator comprising:
a memory for storing instructions;
a processing module coupled to the memory, and configured to process a communication sent from an origination endpoint associated with an origination enterprise to a destination endpoint associated with a destination enterprise, the origination enterprise and the destination enterprise associated with a private dialing plan (PDP) over the packet-switched network;

wherein the processing module is configured to detect a PDP number in the communication and append a customer-specific identifier (CSID) to the detected PDP number, the CSID uniquely identifying the origination enterprise or the destination enterprise; and wherein the processing module is further configured to transceive call routing information with a gatekeeper in the packet-switched network, the gatekeeper being able to determine, according to selection criteria, whether to route the communication from the origination endpoint to the destination endpoint over a packet-switched network or circuit-switched network, wherein the selection criteria includes an available bandwidth measurement, and the available bandwidth measurement is based on a comparison of a number of call counts processed by an enterprise gatekeeper with a specified threshold;

wherein the processing module is further configured to initiate call set up procedures to a destination endpoint with an outbound gateway.

7. The call mediator as recited in claim 6, wherein the processing module is further configured to provide the CSID to the gatekeeper, the CSID enabling the gatekeeper to distinguish between the origination enterprise and the destination enterprise.

8. The call mediator as recited in claim 6, wherein the processing module is further configured to receive an address of the outbound gateway from an enterprise gatekeeper.

* * * * *